(12) United States Patent
Kwon et al.

(10) Patent No.: US 12,533,646 B2
(45) Date of Patent: Jan. 27, 2026

(54) DRY POWDER KNEADING APPARATUS

(71) Applicant: SAMSUNG SDI CO., LTD., Yongin-si (KR)

(72) Inventors: Ilkyong Kwon, Yongin-si (KR); Seunguk Kwon, Yongin-si (KR); Seunggwon Bang, Yongin-si (KR); Jinhyon Lee, Yongin-si (KR); Youmin Bang, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/584,157

(22) Filed: Feb. 22, 2024

(65) Prior Publication Data

US 2025/0073652 A1    Mar. 6, 2025

(30) Foreign Application Priority Data

Aug. 29, 2023    (KR) .................. 10-2023-0113818

(51) Int. Cl.
| | |
|---|---|
| *B01F 27/00* | (2022.01) |
| *B01F 23/60* | (2022.01) |
| *B01F 27/72* | (2022.01) |
| *B01F 35/92* | (2022.01) |
| *H01M 4/525* | (2010.01) |
| *H01M 4/62* | (2006.01) |
| *B01F 35/90* | (2022.01) |

(52) U.S. Cl.
CPC .............. *B01F 27/72* (2022.01); *B01F 23/60* (2022.01); *B01F 35/92* (2022.01); *H01M 4/525* (2013.01); *H01M 4/623* (2013.01); *H01M 4/625* (2013.01); *B01F 2035/99* (2022.01); *B01F 2215/044* (2013.01); *B01F 2215/0463* (2013.01); *B01F 2215/0472* (2013.01); *B01F 2215/0481* (2013.01)

(58) Field of Classification Search
CPC .................................. B01F 27/72; B01F 23/60
See application file for complete search history.

(56) References Cited

U.S. PATENT DOCUMENTS

| | | | | |
|---|---|---|---|---|
| 5,727,876 | A | * | 3/1998 | Tynan ..................... B01F 27/72 366/85 |
| 2017/0062797 | A1 | * | 3/2017 | Sugihara ............. H01M 4/0404 |
| 2020/0168895 | A1 | * | 5/2020 | Kim ....................... H01M 4/623 |

(Continued)

FOREIGN PATENT DOCUMENTS

| | | |
|---|---|---|
| CN | 116547826 A | 8/2023 |
| EP | 3 595 052 A2 | 1/2017 |

(Continued)

OTHER PUBLICATIONS

Extended European Search Report dated Jan. 15, 2025, for corresponding European Patent Application No. 24184068.5.

*Primary Examiner* — Anshu Bhatia

(74) *Attorney, Agent, or Firm* — Lee IP Law, P.C.

(57) ABSTRACT

A dry powder kneading apparatus includes a main body including an inner space into which a mixture containing an active material, a conductive material, and a binder is supplied, and a screw inside the inner space of the main body, the screw being configured to move the mixture in one direction and to knead the mixture into fiberized dry powder, and a rotation torque of the screw being 1.4 kgf·m to 42 kgf·m.

19 Claims, 5 Drawing Sheets

(56) References Cited

U.S. PATENT DOCUMENTS

| | | |
|---|---|---|
| 2023/0042207 A1 | 2/2023 | Kang et al. |
| 2023/0178754 A1 | 6/2023 | Kim et al. |
| 2023/0402609 A1 | 12/2023 | Kim et al. |

FOREIGN PATENT DOCUMENTS

| | | |
|---|---|---|
| EP | 3 598 537 A2 | 1/2020 |
| EP | 4 213 243 A1 | 7/2023 |
| JP | 2015-060704 A | 3/2015 |
| JP | 2015-109175 A | 6/2015 |
| KR | 10-2022-0108713 A | 8/2022 |
| KR | 10-2023-0022129 A | 2/2023 |

* cited by examiner

FIG. 3

| Test condition | | | Test Result | | | |
|---|---|---|---|---|---|---|
| | Feeding rate kg/hr | Shift speed Rpm | Torque kgf·m | Temperature zone ℃ | Optical image | SEM image | Kneading OK/NG |
| CO1 | 10 | 60 | 1.6 | 93 | | | NG |
| EX1 | 25 | 60 | 7.8 | 139 | | | OK |
| EX2 | 40 | 90 | 6.1 | 126 | | | OK |
| EX3 | 25 | 60 | 3.4 | 146 | | | OK |
| CO2 | 25 | 60 | 4.4 | 148 | | - | NG |
| CO3 | 25 | 60 | 5.0 | 148 | | - | NG |

DRY POWDER KNEADING APPARATUS

CROSS-REFERENCE TO RELATED APPLICATION

This application claims priority to and the benefit of Korean Patent Application No. 10-2023-0113818, filed in the Korean Intellectual Property Office on Aug. 29, 2023, the entire contents of which are incorporated herein by reference.

BACKGROUND

1. Field

The present disclosure relates to a dry powder kneading apparatus.

2. Description of the Related Art

Generally, a rechargeable battery is a battery that may be repeatedly charged and discharged. Recently, an apparatus for manufacturing a dry electrode for a rechargeable battery that does not use a solvent is desired.

SUMMARY

Aspects of embodiments provide a dry powder kneading apparatus including a main body including an inner space into which a mixture containing an active material, a conductive material, and a binder is supplied; and a screw that is disposed in the inner space of the main body, moves the mixture in one direction, and kneads it into fiberized dry powder, wherein a rotation torque of the screw is 1 to 30 times 1.4 kgf·m.

A temperature of the inner space of the main body may be 110° C. or higher.

A rotation torque of the screw may be 6.1 kgf·m to 34 kgf·m.

An amount of the active material may be 90 wt % to 99 wt % of the mixture, an amount of the conductive material may be 0.5 wt % to 9.5 wt % of the mixture, and an amount of the binder may be 0.5 wt % to 10 wt % of the mixture.

The active material may include nickel cobalt aluminum (NCA), the conductive material may include at least one of Ketjen black and carbon nanotubes, and the binder may include polytetrafluoroethylene (PTFE).

An amount of the active material may be 96 wt % of the mixture, an amount of the conductive material may be 1.8 wt % of the mixture, and an amount of the binder may be 2.2 wt % of the mixture.

A temperature of the inner space of the main body may be 126° C. to 146° C.

A shaft speed of the screw may be 60 RPM to 90 RPM.

A feeding rate of the mixture may be 25 kg/hr to 40 kg/hr.

The dry powder kneading apparatus may further include a feeder that supplies the mixture to the main body.

The dry powder kneading apparatus may further include a motor connected to the screw to rotate the screw.

The dry powder kneading apparatus may further include a torque meter disposed between the motor and the screw and measuring a rotation torque of the screw.

The dry powder kneading apparatus may further include a plurality of heaters installed on an outer surface of the main body.

The screw may include a conveying element moving the mixture in one direction; a kneading element connected to the conveying element to knead the mixture into the fiberized dry powder; and a neutral element connected to the kneading element to block movement of the dry powder in one direction.

The main body may further include an inlet through which the mixture is input; and an outlet adjacent to the neutral element and discharging the dry powder.

Aspects of embodiments provide a method of forming fiberized dry powder, including forming a mixture containing an active material, a conductive material, and a binder, supplying the mixture to an inner space of a main body of a dry powder kneading apparatus, operating a screw inside the inner space of the main body at a rotation torque of 1.4 kgf·m to 42 kgf·m, such the screw moves the mixture in one direction through the main body and kneads the mixture into fiberized dry powder.

An amount of the active material may be 90 wt % to 99 wt % of a total weight of the mixture, an amount of the conductive material may be 0.5 wt % to 9.5 wt % of the total weight of the mixture, and an amount of the binder may be 0.5 wt % to 9.5 wt % of the total weight of the mixture.

The active material may include nickel cobalt aluminum, the conductive material includes at least one of Ketjen black and carbon nanotubes, and the binder includes polytetrafluoroethylene.

Operating the screw may include heating the inner space of the main body to a temperature of 126° C. to 146° C.

Operating the screw may include rotating a shaft of the screw at 60 RPM to 90 RPM.

BRIEF DESCRIPTION OF THE DRAWINGS

Features will become apparent to those of skill in the art by describing in detail exemplary embodiments with reference to the attached drawings, in which:

FIG. 3 illustrates a table of experimental results for confirming the effect of a dry powder kneading apparatus according to an embodiment.

DETAILED DESCRIPTION

Figure 1:
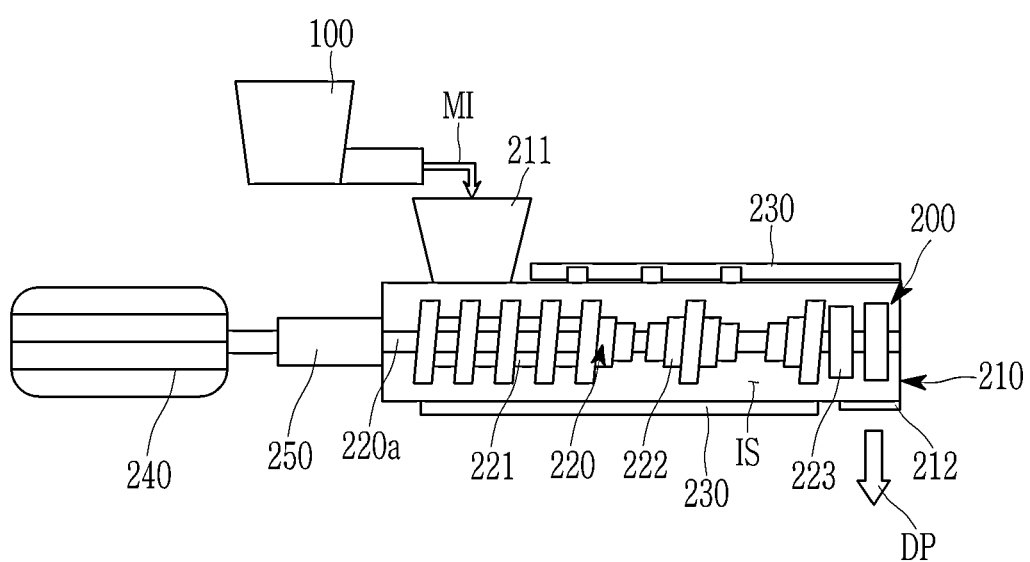
FIG. 1 illustrates a dry powder kneading apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements.

Hereinafter, a dry powder kneading apparatus according to an embodiment will be described with reference to FIG. 1 and FIGS. 2A-2C.

Figure 2A:
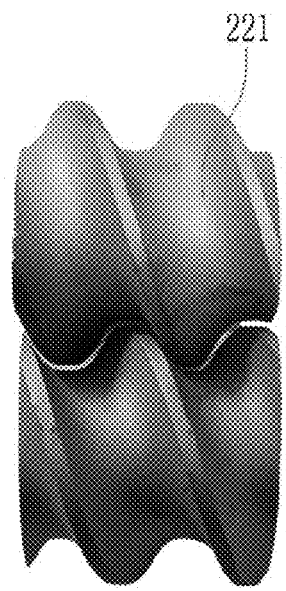
FIGS. 2A-2C illustrate images of respective examples of a conveying element, a kneading device, and a neutral element of a screw of a dry powder kneading apparatus according to an embodiment.
Figure 2B:
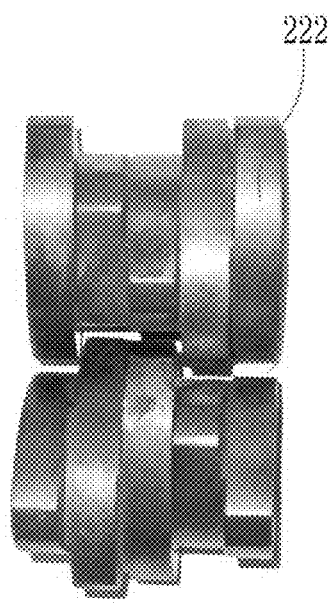
Figure 2C:
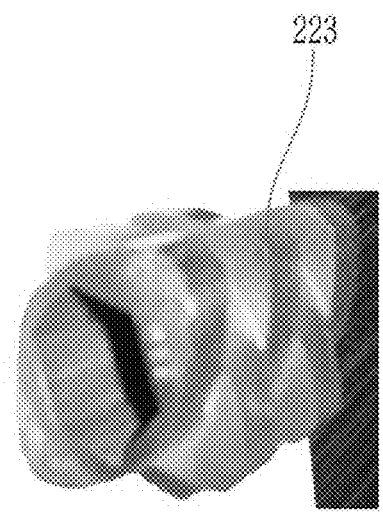

FIG. 1 illustrates a dry powder kneading apparatus according to an embodiment. FIG. 2A illustrates an image of a conveying element of a screw of a dry powder kneading apparatus according to an embodiment, FIG. 2B illustrates an image of a kneading device of a screw of a dry powder kneading apparatus according to an embodiment, and FIG. 2C illustrates an image of a neutral element of a screw of a dry powder kneading apparatus according to an embodiment.

For example, a dry powder kneading apparatus according to an embodiment may be an apparatus in which a mixture including an active material, a conductive material, and a binder is kneaded into fiberized dry powder to manufacture a dry electrode for a rechargeable battery. In another example, the dry powder kneading apparatus according to an embodiment may be an apparatus that supplies suitable wet electrode materials included in suitable wet electrode manufacturing apparatuses. In yet another example, the dry powder fiberized by the dry powder kneading apparatus according to an embodiment may be supplied to suitable calendering apparatuses that manufacture free-standing films.

Referring to FIG. 1, the dry powder kneading apparatus according to the embodiment may knead a mixture MI including an active material, a conductive material, and a binder into a fiberized dry powder DP using a screw 220, and may supply the fiberized dry powder DP to various suitable dry electrode manufacturing apparatuses.

For example, the active material having various suitable electrode active materials including, e.g., nickel cobalt aluminum (NCA), the conductive material may include various suitable conductive materials including, e.g., at least one of Ketjen black and carbon nanotube, and the binder may include various suitable fibrous binders including, e.g., polytetrafluoroethylene (PTFE).

For example, a dry electrode manufacturing apparatus adjacent to the dry powder kneading apparatus may be an apparatus that includes various suitable calendering rolls for calendering the fiberized dry powder DP to manufacture a free-standing film.

The dry powder kneading apparatus according to the embodiment may include a feeder 100 and a kneader 200. The feeder 100 may supply the mixture MI including the active material, the conductive material, and the binder to a main body 210 of the kneader 200. The feeder 100 may quantitatively supply the mixture MI to the feeder 100 by using various suitable quantitative controllers. The mixture MI supplied from the feeder 100 may be kneaded into the dry powder DP fiberized in the kneader 200 and discharged.

For example, the feeder 100 may feed the mixture MI to the kneader 200 at a predetermined feeding rate. For example, the feeder 100 may feed the mixture MI to the kneader 200 at a feeding rate of 25 kg/hr to 40 kg/hr.

For example, the active material included in the mixture MI may be 90 wt % to 99 wt % of the total weight of the mixture MI, the conductive material may be 0.5 wt % to 9.5 wt % of the total weight of the mixture MI, and the binder may be 0.5 wt % to 9.5 wt % of the total weight of the mixture MI. For example, the active material included in the mixture MI may be 96 wt % of the total weight of the mixture MI, the conductive material may be 1.8 wt % of the total weight of the mixture MI, and the binder may be 2.2 wt % of the total weight of the mixture MI.

The kneader 200 may knead the mixture MI supplied from the feeder 100 into the fiberized dry powder DP. The kneader 200 may include the main body 210, the screw 220, a heater 230, a motor 240, and a torque meter 250.

The main body 210 may include an inner space IS, an inlet 211, and an outlet 212. The inlet 211 and the outlet 212 may be in fluid communication with the inner space IS of the main body 210.

The inner space IS may be formed by extending in one direction (e.g., a single direction) from the inside of the main body 210, e.g., the inner space IS may be a volumetric space in the interior of the main body 210. The mixture MI including the active material, the conductive material, and the binder may be supplied from the feeder 100 into the inner space IS of the main body 210 through the inlet 211.

For example, the temperature of the inner space IS of the main body 210 may be 110° C. or higher, e.g., the temperature of the inner space IS of the main body 210 may be 126° C. to 146° C. For example, the temperature of the inner space IS of the main body 210 may be controlled by the heater 230, e.g., the heater 230 may include at least one sensor and controller to adjust the temperature in the inner space IS. In another example, the temperature of the inner space IS of the main body 210 may be controlled by various suitable heating members.

The inlet 211 is a portion into which the mixture MI is input from the feeder 100. The mixture MI may be supplied from the feeder 100 into the inner space IS through the inlet 211. The inlet 211 may be adjacent to a conveying element 221 (e.g., a conveyer) of the screw 220. The mixture MI supplied to the inner space IS through the inlet 211 may be moved to a kneading element 222 (e.g., a fiberizer) of the screw 220 by the conveying element 221 of the screw 220.

The outlet 212 may be spaced apart from the inlet 211 with the inner space IS interposed therebetween, e.g., the outlet 212 and the inlet 211 may be at opposite ends of the inner space IS and at opposite ends of the screw 220 along the longitudinal direction of the screw 220. The outlet 212 is a portion where the dry powder DP fiberized from the mixture MI is discharged by the screw 220 in the inner space IS. The outlet 212 may be adjacent to a neutral element 223 (e.g., a blocker) of the screw 220. The dry powder DP that is blocked from moving in one direction in the inner space IS by the neutral element 223 of the screw 220 may be discharged to the outside through the outlet 212.

The screw 220 may be disposed in the inner space IS of the main body 210. The screw 220 may be rotated by the motor 240 to move the mixture MI supplied to the inner space IS in one direction in the inner space IS and to knead the mixture MI into the fiberized dry powder DP.

The screw 220 may include the conveying element 221, the kneading element 222, and the neutral element 223. For example, as illustrated in FIG. 1, the kneading element 222 may be between the neutral element 223 and the conveying element 221 along a major axis of the screw 220 (e.g., along a longitudinal direction of the screw 220). For example, as illustrated in FIG. 1, the conveying element 221, the kneading element 222, and the neutral element 223 may be aligned along a same main axis extending along the longitudinal direction of the screw 220. For example, as illustrated in FIG. 1, the conveying element 221, the kneading element 222, and the neutral element 223 may be attached to and aligned along a shaft 220a (e.g., a same shaft) of the screw 220.

Referring to FIG. 1 and FIG. 2A, the conveying element 221 moves the mixture MI in one direction. The conveying element 221 moves the mixture MI to the kneading element 222. For example, as illustrated in FIG. 2A, the conveying element 221 may include a thread that extends continuously multiple times around a main body of the screw 220. For example, referring to FIG. 2A, the thread may be defined by a helically shaped ridge that wraps continuously multiple times around the main body of the screw 220, such that the mixture MI may be moved along the thread, e.g., in a space between portions of the helical ridge. In another example, the conveying element 221 may include any suitable conveying screw shapes capable of moving the mixture MI in one direction.

Referring to FIG. 1 and FIG. 2B, the kneading element 222 may be disposed between the conveying element 221 and the neutral element 223. The kneading element 222 may be connected to the conveying element 221 to knead the mixture MI moved from the conveying element 221 to the kneading element 222 into the fiberized dry powder DP and to move the dry powder DP to the neutral element 223. For example, as illustrated in FIG. 2B, the kneading element 222 may include crashing elements facing each other and moveable toward each other, e.g., two rows of hammers or teeth facing each other and moveable toward each other to contact each other, such that the mixture MI moved from the conveying element 221 to the kneading element 222 may be moved through the crashing elements, e.g., through the teeth, of the kneading element 222 to be fiberized into the fiberized dry powder DP. In another example, the kneading element 222 may include any suitable kneading screw shapes capable of kneading the mixture MI into the fiberized dry powder DP.

Referring to FIG. 1 and FIG. 2C, the neutral element 223 may be connected to the kneading element 222. The neutral element 223 may block the fiberized dry powder DP moved from the kneading element 222 from moving in one direction in the inner space IS. The dry powder DP, which is blocked from moving in one direction by the neutral element 223, may be discharged to the outside through the outlet 212 of the main body 210. For example, as illustrated in FIG. 2C, the neutral element 223 may include a plurality of protrusions arranged to be spaced apart from each other along a longitudinal direction of the screw 220 and along a circumferential direction of the main body of the screw 220, e.g., the protrusions may be offset from each other along the longitudinal and circumferential directions of the main body of the screw 220, such that the protrusions may block movement of material, e.g., the fiberized dry powder DP, along the longitudinal direction of the screw 220. In another example, the neutral element 223 may include any suitable neutral screw shapes that may block the movement of the dry powder DP moving along the screw 220 from the kneading element 222 past the neutral element 223 in the inner space IS.

For example, the rotational torque of the screw 220 may be 1 to 30 times 1.4 kgf·m (i.e., 1.4 kgf·m to 42 kgf·m), e.g., 6.1 kgf·m to 34 kgf·m. For example, the shaft speed of the screw 220 may be 60 RPM to 90 RPM. The shaft speed of the screw 220 may be controlled using the motor 240 or various suitable set gear members.

The heater 230 may be installed on the outer surface of the main body 210. The heater 230 may include heating members. The inner space IS of the main body 210 may be heated by the heater 230, so that the temperature of the inner space IS may have a predetermined set temperature. For example, the heater 230 may continuously surround the entire outer surface of the main body 210. In another example, the heater may include a plurality of heating members spaced apart from each other throughout the entire outer surface of the main body 210. For example, the heater 230 may be installed on at least one of the inner surface and the outer surface of the main body 210.

The motor 240 may be connected to the screw 220 to rotate the screw 220. A rotation axis of the motor 240 may be connected to the shaft 220a of the screw 220 or through various gear members. For example, the motor 240 may rotate the screw 220 so that the screw 220 rotates at a predetermined rotation torque. In another example, the rotation torque of the screw 220 may be set by any suitable rotation torque control members.

The torque meter 250 may be disposed between the motor 240 and the screw 220. The torque meter 250 may measure the rotation torque of the screw 220 and the rotation torque of the motor 240. The torque meter 250 may include suitable rotation torque measurement members, e.g., at least one sensor and controller to adjust the gears that set the rotation torque of the screw 220.

The dry powder kneading apparatus according to the present embodiment may include a configuration in which the rotation torque of the screw 220 is 1 to 30 times 1.4 kgf·m and the temperature of the inner space IS of the main body 210 is 110° C. or more. As such, it is possible to suppress damage to the screw 220 for kneading the mixture MI containing the active material, the conductive material, and the binder into the fiberized dry powder DP and to easily knead the mixture MI into the fiberized dry powder DP to manufacture a dry electrode including a free-standing film having improved tensile strength.

The dry powder kneading apparatus according to the embodiment may include a configuration in which the rotation torque of the screw 220 is 6.1 kgf·m to 34 kgf·m and the temperature of the inner space IS of the main body 210 is 126° C. to 146° C. As such, it is possible to suppress damage to the screw 220 for kneading the mixture MI containing the active material, the conductive material, and the binder into the fiberized dry powder DP and to easily knead the mixture MI into the fiberized dry powder DP to manufacture a dry electrode including a free-standing film having improved tensile strength.

The following Experimental Examples and Comparative Examples are provided in order to highlight characteristics of one or more embodiments, but it will be understood that the Experimental Examples and Comparative Examples are not to be construed as limiting the scope of the embodiments, nor are the Comparative Examples to be construed as being outside the scope of the embodiments. Further, it will be understood that the embodiments are not limited to the particular details described in the Experimental Examples and Comparative Examples.

Results of the Experimental Examples and Comparative Examples will be described with reference to FIG. 3. FIG. 3 illustrates a table of experimental results for confirming the effect of a dry powder kneading apparatus according to an embodiment.

Referring to FIG. 3, Experimental Example 1 (EX1), Experimental Example 2 (EX2), Experimental Example 3 (EX3), Comparative Example 1 (CO1), Comparative Example 2 (CO2), and Comparative Example 3 (CO3) were performed using the dry powder kneading apparatus according to an embodiment.

Experimental Example 1

A mixture containing 96 wt % of an active material containing NCA (nickel cobalt aluminum), 1.8 wt % of a conductive material containing Ketjen black, and 2.2 wt % of a binder containing PTFE (polytetrafluoroethylene) was fed into the inner space of the kneader at a feeding rate of 25 kg/hr. The shaft speed of the screw of the kneader that kneaded the mixture into fiberized dry powder was 60 RPM, the rotation torque of the screw was 1.7 kgf·m, and the temperature of the inner space of the kneader was 139° C. As a result of the experiment in Experimental Example 1 (EX1), as confirmed in the optical image and SEM image, the fiberization kneading from the mixture to the dry powder was easily performed (OK).

Experimental Example 2

A mixture containing 96 wt % of an active material containing NCA (nickel cobalt aluminum), 1.8 wt % of a conductive material containing Ketjen black, and 2.2 wt % of a binder containing PTFE (polytetrafluoroethylene) was fed into the inner space of the kneader at a feeding rate of 40 kg/hr. The shaft speed of the screw of the kneader that kneaded the mixture into fiberized dry powder was 90 RPM, the rotation torque of the screw was 6.1 kgf·m, and the temperature of the inner space of the kneader was 126° C. As a result of the experiment in Experimental Example 2 (EX2), as confirmed in the optical image and SEM image, the fiberization kneading from the mixture to the dry powder was easily performed (OK).

Experimental Example 3

A mixture containing 96 wt % of an active material containing NCA (nickel cobalt aluminum), 1.8 wt % of a conductive material containing Ketjen black, and 2.2 wt % of a binder containing PTFE (polytetrafluoroethylene) was fed into the inner space of the kneader at a feeding rate of 25 kg/hr. The shaft speed of the screw of the kneader that kneaded the mixture into fiberized dry powder was 60 RPM, the rotation torque of the screw was 34 kgf·m, and the temperature of the inner space of the kneader was 146° C. As a result of the experiment in Experimental Example 3 (EX3), as confirmed in the optical image and SEM image, the fiberization kneading from the mixture to the dry powder was easily performed (OK).

Comparative Example 1

A mixture containing 96 wt % of an active material containing NCA (nickel cobalt aluminum), 1.8 wt % of a conductive material containing Ketjen black, and 2.2 wt % of a binder containing PTFE (polytetrafluoroethylene) was fed into the inner space of the kneader at a feeding rate of 10 kg/hr. The shaft speed of the screw of the kneader that kneaded the mixture into fiberized dry powder was 60 RPM, the rotation torque of the screw was 1.6 kgf·m, and the temperature of the inner space of the kneader was 93° C. As a result of the experiment in Comparative Example 1 (CO1), as confirmed in the optical image and SEM image, the fiberization kneading from the mixture to the dry powder was not performed due to the low temperature of the inner space of the kneader (NG).

Comparative Example 2

A mixture containing 96 wt % of an active material containing NCA (nickel cobalt aluminum), 1.8 wt % of a conductive material containing Ketjen black, and 2.2 wt % of a binder containing PTFE (polytetrafluoroethylene) was fed into the inner space of the kneader at a feeding rate of 25 kg/hr. The shaft speed of the screw of the kneader that kneaded the mixture into fiberized dry powder was 60 RPM, the rotation torque of the screw was 44 kgf·m, and the temperature of the inner space of the kneader was 148° C. As a result of the experiment in Comparative Example 2 (CO2), due to the excess of the rotation torque allowed in the screw of the kneader, the screw was stopped by various known guard members such as shaft interlock, and the fiberization kneading from the mixture to the dry powder was not performed (NG).

Comparative Example 3

A mixture containing 96 wt % of an active material containing NCA (nickel cobalt aluminum), 1.8 wt % of a conductive material containing Ketjen black, and 2.2 wt % of a binder containing PTFE (polytetrafluoroethylene) was fed into the inner space of the kneader at a feeding rate of 25 kg/hr. The shaft speed of the screw of the kneader that kneaded the mixture into fiberized dry powder was 60 RPM, the rotation torque of the screw was 50 kgf·m, and the temperature of the inner space of the kneader was 148° C. As a result of the experiment in Comparative Example 3 (CO3), due to the excess of the rotation torque allowed in the screw of the kneader, the screw was broken, so that the fiberization kneading from the mixture to the dry powder was not performed (NG). Comparative Example 3 (CO3) was performed by disengaging a guard member such as shaft interlock.

Experimental Results

According to the experimental results of Experimental Example 1 (EX1), Experimental Example 2 (EX2), Experimental Example 3 (EX3), Comparative Example 1 (CO1), Comparative Example 2 (CO2), and Comparative Example 3 (CO3) described above, in order to realize the task and effect of manufacturing the dry electrode that suppresses the damage of the screw that kneads the mixture containing the active material, conductive material, and binder into the fiberized dry powder, and at the same time, that includes the free-standing film with improved tensile strength by easily kneading the mixture into the fiberized dry powder, it is confirmed that the numerically limited configuration in which the rotational torque of the screw of the kneader of the dry powder kneading apparatus according to the embodiment is 6.1 kgf·m to 34 kgf·m has a critical significance to confirm that the upper and lower limits are thresholds.

In addition, according to the experimental results of Experimental Example 1 (EX1), Experimental Example 2 (EX2), Experimental Example 3 (EX3), Comparative Example 1 (CO1), Comparative Example 2 (CO2), and Comparative Example 3 (CO3) described above, in order to realize the task and effect of manufacturing the dry electrode that suppresses the damage of the screw that kneads the mixture containing the active material, conductive material, and binder into the fiberized dry powder, and at the same time, that includes the free-standing film with improved tensile strength by easily kneading the mixture into the fiberized dry powder, it is confirmed that the numerically limited configuration in which the rotational torque of the screw of the kneader of the dry powder kneading apparatus according to the embodiment is 6.1 kgf·m to 34 kgf·m and the temperature of the inner space of the main body of the kneader thereof is 126° C. to 146° C. has a critical significance to confirm that the upper and lower limits are thresholds.

In addition, according to the experimental results of Experimental Example 1 (EX1), Experimental Example 2 (EX2), Experimental Example 3 (EX3), Comparative Example 1 (CO1), Comparative Example 2 (CO2), and Comparative Example 3 (CO3) described above, in order to realize the task and effect of manufacturing the dry electrode that suppresses the damage of the screw that kneads the mixture containing the active material, conductive material, and binder into the fiberized dry powder, and at the same time, that includes the free-standing film with improved tensile strength by easily kneading the mixture into the fiberized dry powder, it is confirmed that the numerically limited configuration in which the rotational torque of the screw of the kneader of the dry powder kneading apparatus according to the embodiment, in which the mixture containing 96 wt % of an active material containing NCA (nickel cobalt aluminum), 1.8 wt % of a conductive material containing Ketjen black, and 2.2 wt % of a binder containing PTFE (polytetrafluoroethylene) is kneaded, is 6.1 kgf·m to 34 kgf·m and the temperature of the inner space of the main body of the kneader thereof is 126° C. to 146° C. has a critical significance to confirm that the upper and lower limits are thresholds.

By way of summation and review, a dry electrode may be manufactured by kneading a mixture including an active material, a conductive material, and a binder into fiberized dry powder using a kneading apparatus, manufacturing the fiberized dry powder into a free-standing film using a calendering roll, and laminating the free-standing film to a current collector. The conventional dry powder kneading apparatus may include a screw for kneading the mixture including the active material, the conductive material, and the binder into the fiberized dry powder.

The conventional dry powder kneading apparatus performs kneading by increasing the rotational torque of the screw because the dry powder that is fiberized from the mixture by the screw has low flowability and high cohesiveness. However, as the rotational torque increases, the screw may be damaged or may stop.

In contrast, exemplary embodiments provide a dry powder kneading apparatus for manufacturing a dry electrode that may suppress damage to a screw kneading a mixture including an active material, a conductive material, and a binder into fiberized dry powder and that may include a free-standing film with improved tensile strength by easily kneading a mixture into fiberized dry powder.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A dry powder kneading apparatus, comprising:
   a main body including an inner space into which a mixture containing an active material, a conductive material, and a binder is suppliable; and
   a screw inside the inner space of the main body, the screw being configured to move the mixture in one direction and to knead the mixture into fiberized dry powder, and a rotation torque of the screw being 1.4 kgf·m to 42 kgf·m,
   wherein the screw includes:
     a conveyer configured to move the mixture in the one direction,
     a fiberizer connected to the conveyer, the fiberizer being configured to knead the mixture into the fiberized dry powder, and
     a blocker connected to the fiberizer, the blocker being configured to block movement of the dry powder in the one direction.

2. The dry powder kneading apparatus as claimed in claim 1, wherein a temperature of the inner space of the main body is heatable to 110° C. or higher.

3. The dry powder kneading apparatus as claimed in claim 1, wherein the rotation torque of the screw is 6.1 kgf·m to 34 kgf·m.

4. The dry powder kneading apparatus as claimed in claim 3, wherein:
   an amount of the active material is 90 wt % to 99 wt % of a total weight of the mixture,
   an amount of the conductive material is 0.5 wt % to 9.5 wt % of the total weight of the mixture, and
   an amount of the binder is 0.5 wt % to 9.5 wt % of the total weight of the mixture.

5. The dry powder kneading apparatus as claimed in claim 4, wherein:
   the active material includes nickel cobalt aluminum,
   the conductive material includes at least one of Ketjen black and carbon nanotubes, and
   the binder includes polytetrafluoroethylene.

6. The dry powder kneading apparatus as claimed in claim 5, wherein:
   an amount of the active material is 96 wt % of the total weight of the mixture,
   an amount of the conductive material is 1.8 wt % of the total weight of the mixture, and
   an amount of the binder is 2.2 wt % of the total weight of the mixture.

7. The dry powder kneading apparatus as claimed in claim 3, wherein a temperature of the inner space of the main body is 126° C. to 146° C.

8. The dry powder kneading apparatus as claimed in claim 3, wherein a shaft speed of the screw is 60 RPM to 90 RPM.

9. The dry powder kneading apparatus as claimed in claim 1, further comprising a feeder configured to supply the mixture to the main body.

10. The dry powder kneading apparatus as claimed in claim 9, wherein the feeder is configured to have a feeding rate of 25 kg/hr to 40 kg/hr.

11. The dry powder kneading apparatus as claimed in claim 1, further comprising a motor connected to the screw, the motor being configured to rotate the screw.

12. The dry powder kneading apparatus as claimed in claim 11, further comprising a torque meter between the motor and the screw, the torque meter being configured to measure a rotation torque of the screw.

13. The dry powder kneading apparatus as claimed in claim 1, further comprising a plurality of heaters on an outer surface of the main body.

14. The dry powder kneading apparatus as claimed in claim 1, wherein the main body further includes an inlet through which the mixture is input, and an outlet adjacent to the blocker and configured to discharge the dry powder.

15. A method of forming fiberized dry powder, the method comprising:
- forming a mixture containing an active material, a conductive material, and a binder;
- supplying the mixture to an inner space of a main body of a dry powder kneading apparatus; and
- operating a screw inside the inner space of the main body at a rotation torque of 1.4 kgf·m to 42 kgf·m, such the screw moves the mixture in one direction through the main body and kneads the mixture into fiberized dry powder wherein the screw includes:
- a conveyer configured to move the mixture in the one direction,
- a fiberizer connected to the conveyer, the fiberizer being configured to knead the mixture into the fiberized dry powder, and
- a blocker connected to the fiberizer, the blocker being configured to block movement of the dry powder in the one direction.

16. The method as claimed in claim 15, wherein:
- an amount of the active material is 90 wt % to 99 wt % of a total weight of the mixture,
- an amount of the conductive material is 0.5 wt % to 9.5 wt % of the total weight of the mixture, and
- an amount of the binder is 0.5 wt % to 9.5 wt % of the total weight of the mixture.

17. The method as claimed in claim 16, wherein:
- the active material includes nickel cobalt aluminum,
- the conductive material includes at least one of Ketjen black and carbon nanotubes, and
- the binder includes polytetrafluoroethylene.

18. The method as claimed in claim 17, wherein operating the screw includes heating the inner space of the main body to a temperature of 126° C. to 146° C.

19. The method as claimed in claim 17, wherein operating the screw includes rotating a shaft of the screw at 60 RPM to 90 RPM.

* * * * *